(12) United States Patent
Joshi

(10) Patent No.: US 7,661,061 B2
(45) Date of Patent: Feb. 9, 2010

(54) VISUALIZATION OF COLLABORATIVE PORTLET SEQUENCES

(75) Inventor: Niraj P. Joshi, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 808 days.

(21) Appl. No.: 11/252,301

(22) Filed: Oct. 17, 2005

(65) Prior Publication Data

US 2007/0089047 A1   Apr. 19, 2007

(51) Int. Cl.
*G06F 17/00*   (2006.01)
(52) U.S. Cl. ................................ 715/205; 715/200
(58) Field of Classification Search .............. 715/200, 715/255, 205
See application file for complete search history.

(56) References Cited

U.S. PATENT DOCUMENTS

| | | | |
|---|---|---|---|
| 5,689,668 A | 11/1997 | Beaudet et al. | 395/353 |
| 6,826,729 B1 | 11/2004 | Giesen et al. | 715/837 |
| 6,886,134 B1 | 4/2005 | Cason | 715/760 |
| 7,376,900 B2* | 5/2008 | Guido et al. | 715/742 |
| 7,451,194 B2* | 11/2008 | Bowser et al. | 709/219 |
| 2002/0023178 A1 | 2/2002 | Strasnick et al. | 709/329 |
| 2002/0154172 A1 | 10/2002 | Linsey et al. | 345/804 |
| 2002/0184534 A1* | 12/2002 | Rangan et al. | 713/201 |
| 2003/0189598 A1 | 10/2003 | Lipstein et al. | 345/781 |
| 2004/0061720 A1* | 4/2004 | Weber | 345/760 |
| 2004/0133660 A1 | 7/2004 | Junghuber et al. | |
| 2004/0207665 A1 | 10/2004 | Mathur | 345/853 |
| 2004/0268258 A1 | 12/2004 | Lee et al. | 715/708 |
| 2005/0198195 A1* | 9/2005 | Bowser et al. | 709/217 |
| 2006/0070002 A1* | 3/2006 | Guido et al. | 715/733 |
| 2006/0129935 A1* | 6/2006 | Deinlein et al. | 715/733 |
| 2006/0184883 A1* | 8/2006 | Jerrard-Dunne et al. | 715/742 |
| 2006/0190448 A1* | 8/2006 | Bartek et al. | 707/5 |
| 2006/0218000 A1* | 9/2006 | Smith et al. | 705/1 |
| 2007/0005731 A1* | 1/2007 | Lection et al. | 709/219 |
| 2007/0016857 A1* | 1/2007 | Polleck et al. | 715/530 |
| 2007/0067324 A1* | 3/2007 | Burkhardt | 707/101 |
| 2007/0106976 A1* | 5/2007 | Facemire et al. | 717/106 |
| 2008/0028300 A1* | 1/2008 | Krieger et al. | 715/255 |

(Continued)

FOREIGN PATENT DOCUMENTS

WO   WO2004031985 A2   4/2004

OTHER PUBLICATIONS

Lovas et al., Workflow Support for Complex Grid Applications: Integrated and Portal Solutions, Google Scholar 2004, pp. 129-138.*

(Continued)

*Primary Examiner*—Cong-Lac Huynh
(74) *Attorney, Agent, or Firm*—Robert E. Straight, II; Law Office of Jim Boice

(57) ABSTRACT

An improved method, apparatus, and computer usable code for managing a plurality of content portlets in a portal page. A workflow is identified for the plurality of content portlets in the portal page to form an identified workflow. The identified workflow specifies a sequence of tasks in which the plurality of content portlets is executed. A control portlet in the portal page controls execution of content portlets within the plurality of content portlets using the identified workflow.

17 Claims, 7 Drawing Sheets

U.S. PATENT DOCUMENTS

2008/0040180 A1* 2/2008 Aleong et al. .................. 705/8
2008/0294719 A1* 11/2008 Bowser et al. .............. 709/203

OTHER PUBLICATIONS

Hluchy et al., Infrastructure for Grid-Based Virtual Organizations, Google Scholar 2004, pp. 124-131.*

Suzumura et al., GridSpeed: A Web-based Grid Portal Generation Server, IEEE 2004, pp. 1-8.*

Beeson et al., A Portal for Grid-enabled Physics, Google 2005, pp. 13-20.*

Chowdhury, Using Cooperative Portlets in WebShere Portal V5, Google Oct. 2003, pp. 1-28.*

Novotny et al., GridSphere: A Portal Framework for Building Collaborations, Google 2004, pp. 1-8.*

Keen et al., "Patterns: Serial and Parallel Processes for Process Choreography and Workflow", IBM Redbooks, Apr. 2004, pp. 1-442, retrieved Jun. 25, 2007 http://www.redbooks.ibm.com/abstracts/SG246306.html.

Leymann et al., "Web Services and Business Process Management", IBM Systems Journal, vol. 41, No. 2, 2002, pp. 198-211.

Will et al., "WebSphere Portal: Unified User Access to Content, Applications and Services", IBM Systems Journal, Apr. 2004, pp. 420-429.

Lection et al., "WebSphere Portal Programming: Portlet Application Programming, Part 2—Give and Take Portlet Messaging Techniques", Internet citation Mar. 1, 2002, retrieved Apr. 7, 2004 http://www-106.ibm.com/developerworks/ibm/library/i-portal2/?loc=dwmain.

Leymann et al., "Using Flows in Information Integration", IBM Systems Journal, Information Integration, vol. 41, No. 4, 2002, pp. 732-742.

* cited by examiner

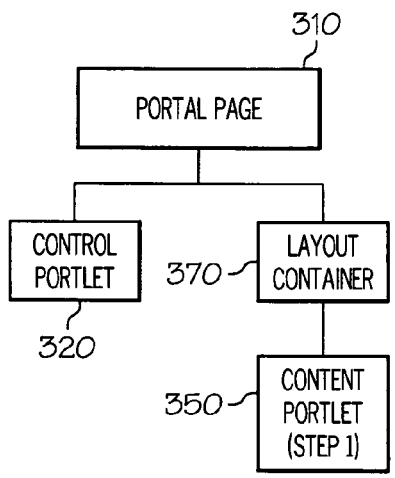
```
//SEQUENCE NUMBER, TASK NAME, LAYOUT, PORTLET IDS
1, STEP-1, HORIZONTAL, "PORTLETS1"
2, STEP-2, HORIZONTAL, "PORTLETS21", "PORTLETS22"
3, STEP-3, VERTICAL, "PORTLETS31", "PORTLETS32"
...
```
FIG. 3C
FIG. 3A
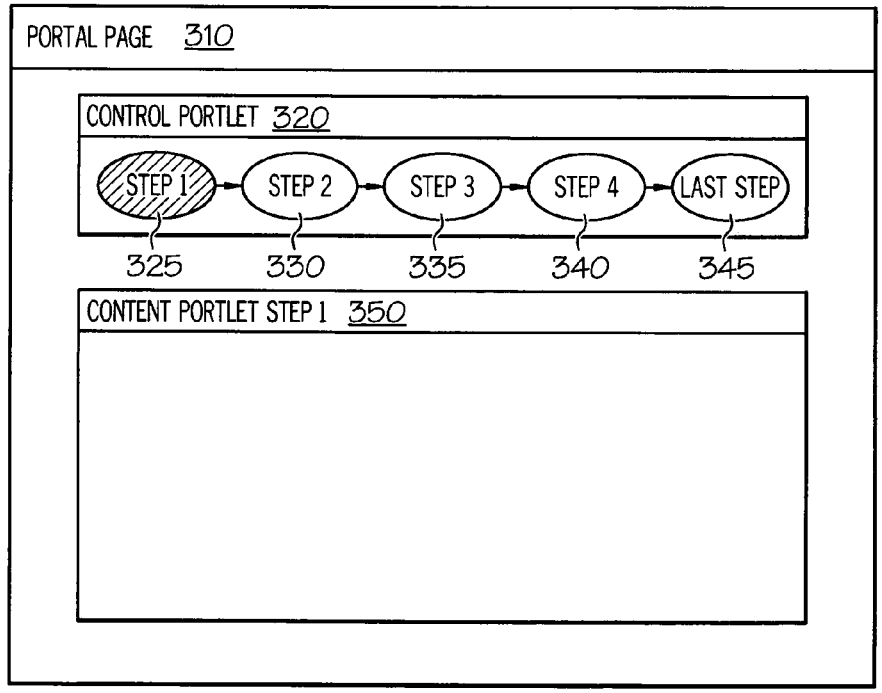
FIG. 3B

VISUALIZATION OF COLLABORATIVE PORTLET SEQUENCES

BACKGROUND OF THE INVENTION

1. Field of the Invention

The present invention is directed to a method, apparatus, and computer usable code for graphical user interface (GUI). In particular, the present invention is directed to a method, apparatus, and computer usable code for sequencing collaborative portlets to form a workflow.

2. Description of the Related Art

A portlet is a reusable component of a portal page capable of displaying information and generating dynamic content to portal users. In web portals, portlets are used to accomplish a particular task or provide visualization of content. An individual portlet also may be implemented to present content in a particular workflow within that portlet. A workflow is a sequence of tasks in which each task involves the execution of one or more portlets. In other words, the workflow for a set of portlets involves the execution of the portlets in a particular order.

In order to accomplish an activity or a workflow utilizing the contents of multiple existing portlets in a portal page, portlets need to be executed and visualized in a particular sequence within the portal page. However, current web portals do not provide a mechanism to sequence a set of existing portlets in a workflow.

Existing portlet contents are typically linked to form a workflow by re-implementing the existing portlets to form a single new portlet within the portal page. This new portlet may be capable of permitting a user to navigate through portlet contents of the newly re-implemented portlet in order to execute and visualize portlet contents in a particular sequence. Because existing portlets must be re-implemented into a single portlet, the flexibility, reusability, and customization capabilities of each separate portlet are lost.

BRIEF SUMMARY OF THE INVENTION

The aspects of the present invention manage a plurality of content portlets in a portal page. A portal page comprises a plurality of content portlets placed in a sequence to form a workflow. A workflow is identified for the plurality of content portlets in the portal page to form an identified workflow. The identified workflow specifies a sequence of tasks in which the plurality of content portlets is executed. A control portlet in the portal page controls execution of content portlets within the plurality of content portlets using the identified workflow.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3A is exemplary diagram illustrating a portal page hierarchy in accordance with one exemplary embodiment of the present invention;

FIG. 3B is an exemplary illustration of portal page visualization in accordance with one exemplary embodiment of the present invention;

FIG. 3C is an exemplary illustration of a Comma Separated Value file format defining a workflow in accordance with one exemplary embodiment of the present invention;

DETAILED DESCRIPTION OF THE INVENTION

Portals are Web-based applications that display information aggregated from various sources on a single page. A portlet is a reusable component of a portal page typically displaying information content in a small window or content area on a portal page. A portlet is capable of processing requests, accomplishing specific tasks, generating dynamic content and displaying information to users of portal pages. Because a portlet is a modular component of a portal, portlets permit flexibility and customization capabilities within a portal page.

The aspects of the present invention provide an improved method, apparatus, and computer usable code for sequencing collaborative portlets to form a workflow on a portal page. The portlets comprising the workflow are implemented as individual portlets linked together within the portal page to form a sequence of tasks.

Figure 1:
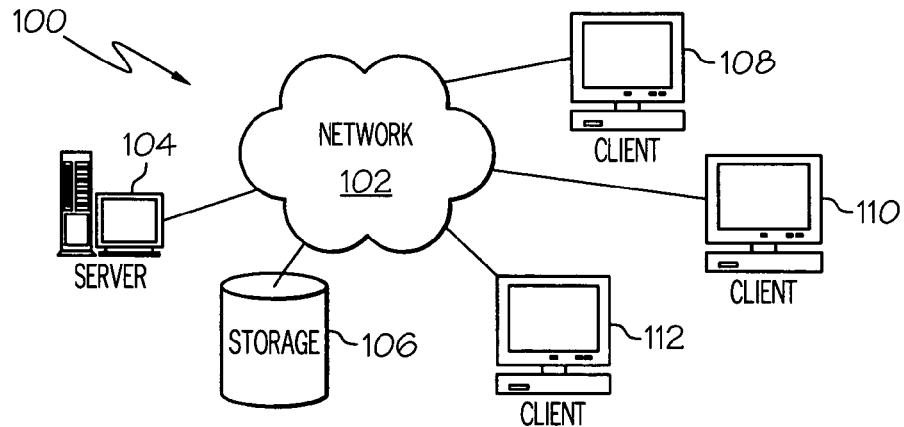
FIG. 1 depicts a pictorial representation of a network of data processing systems in which aspects of the present invention may be implemented.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 connects to network 102 along with storage unit 106. In addition, clients 108, 110, and 112 connect to network 102. These clients 108, 110, and 112 may be, for example, personal computers or network computers. In the depicted example, server 104 may be a web server that providers portal pages and applications to clients 108-112. Examples of portal servers that provide portal pages to clients include IBM WebSphere® Portal, Sun Java® system Portal Server, BEA® Weblogic Portal, and Oracle® Portal Server. Clients 108, 110, and 112 are clients to server 104.

Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

Figure 2:
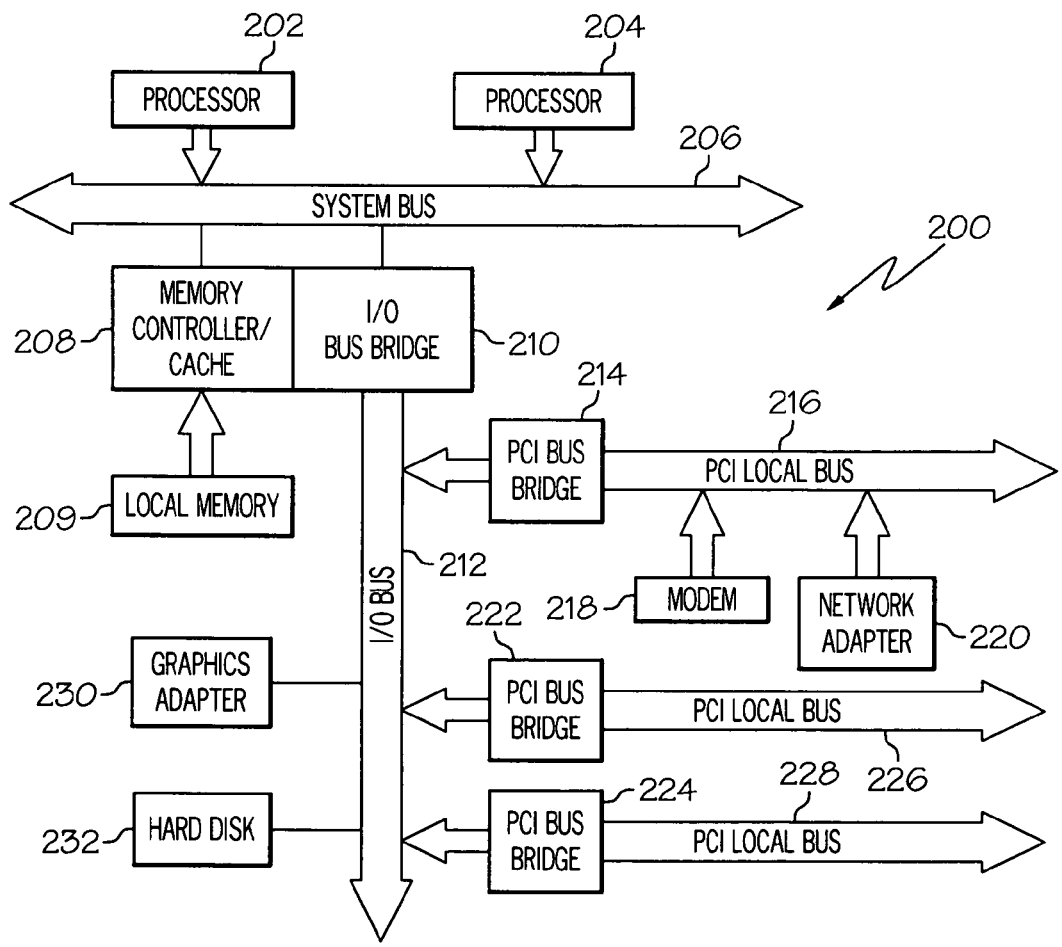
FIG. 2 is a block diagram of a data processing system that may be implemented as a server in accordance with an illustrative embodiment of the present invention.

Referring to FIG. 2, a block diagram of a data processing system that may be implemented as a server, such as server 104 in FIG. 1, is depicted in accordance with an illustrative embodiment of the present invention. Data processing system 200 may be a symmetric multiprocessor (SMP) system including a plurality of processors 202 and 204 that connect to system bus 206. Alternatively, a single processor system may be employed. Also connected to system bus 206 is memory controller/cache 208, which provides an interface to local memory 209. I/O bus bridge 210 connects to system bus 206 and provides an interface to I/O bus 212. Memory controller/cache 208 and I/O bus bridge 210 may be integrated as depicted.

Peripheral component interconnect (PCI) bus bridge 214 connects to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both).

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the present invention may be applied to a multiprocessor data processing system.

FIGS. 1 and 2 are provided merely as exemplary diagrams of data processing environments in which embodiments of the present invention may be implemented. It should be appreciated that FIGS. 1 and 2 are only exemplary and are not intended to assert or imply any structural or environmental limitations with regard to the aspects or embodiments of the present invention may be implemented. In addition, modifications may be made to the depicted environments without departing from the spirit and scope of the present invention.

FIG. 3A is an illustrative example of a portal page hierarchy in accordance with one illustrative embodiment of the present invention. In a web portal, such as portal page 310, a portlet may be used to provide visualization of content or accomplish a particular task in a sequence of tasks. Existing portlets from various sources, such as content portlet 350, may be linked together within portal page 310 to form a workflow.

A workflow is a sequence of tasks. In a portal based workflow, each task in a sequence of tasks is implemented by executing one or more content portlets, such as content portlet 350. A workflow is identified for a plurality of content portlets in a portal page to form an identified workflow. The identified workflow specifies a sequence of tasks in which the plurality of content portlets is executed. A control portlet on the portal page controls execution of content portlets using the identified workflow.

A content portlet is a portlet that constitutes the visualization of a particular task or a subset of the task and assists in accomplishing that task. A content portlet is capable of processing requests, generating dynamic content, and displaying information associated with each task in the workflow.

A portal based workflow can be defined by specifying a sequence of tasks, content portlets associated with each task, and portlet layouts. Portal page layout is defined in terms of a hierarchy of layout containers, such as layout container 370, and one or more content portlets, such as content portlet 350.

Referring now to FIG. 3C, an illustrative example of a comma separated value (CSV) file format defining a workflow is provided in accordance with one exemplary embodiment of the present invention. The workflow is defined by specifying the sequence of tasks for each step in the workflow, portlets associated with each step in the workflow, and the layout for each portlet. More complex mechanisms like Flow Definition Language (FDL) or Business Process Execution Language (BPEL) can also be used to define a portal based workflow in accordance with the aspects of the present invention.

Workflow definition requires knowledge of the sequence of tasks associated with each step in the workflow, portlets, layouts, and conditions associated with execution of tasks. Control portlet reads the workflow definition and creates visualization of the workflow, as shown in FIG. 3B which is discussed more fully below.

Returning now to FIG. 3A, control portlet 320, located on portal page 310, receives a definition or configuration for the workflow specifying the specific sequence of tasks, content portlets associated with each task, and content portlet layouts. Control portlet 320 then programmatically manipulates the content of portal page 310 to display a representation of content portlets associated with one or more steps in the defined sequence of tasks in the workflow. Programmatic manipulation involves manipulation of the data structure via a program, typically located in memory, without user intervention. In one embodiment of the present invention, portal page layout may be manipulated utilizing Websphere® Portal transient pages utility to specify content portlet layout.

Referring again to FIG. 3A, when a user chooses to navigate from a previous step in the workflow to a next step in the workflow, control portlet 320 manipulates the portal page content by removing content portlet(s) associated with the previous step and adding content associated with next step. Thus, for example, in going from step 1 to step 2, control portlet 320 manipulates the page hierarchy by first removing content portlet 350 associated with step 1 and adding content portlets 450 and 460 associated with step 2 (as illustrated FIG. 4A). Upon rendering a particular step, control portlet 320 will enable display of content portlets associated with that specified step. To render a particular step means to display content portlet contents on the portal page.

Control portlet provides a visualization of at least one of the steps in the workflow on the control portlet on the portal page. A user may select or specify a step for implementation by selecting a graphical control, such as controls 325-345 (as is shown in FIG. 3B), or a link on control portlet 320 representing the selected step. A specified step may comprise one or more specified tasks in the workflow to be performed by a user.

Content portlet 350 is managed by layout container 370. Layout container 370 retrieves content portlet 350 associated with a specified step in response to a client request or selection of that specified step in the workflow. In this illustrative example, layout container 370 has retrieved content portlet 350 associated with step 1 in a sequence of collaborative portlets in response to user request. Content portlet 350 associated with the specified step is displayed on portal page 310 in conjunction with control portlet 320.

FIG. 3B is an illustration example of portal page visualization in accordance with one exemplary embodiment of the present invention. Workflow visualization on control portlet 320 provides an interactive utility enabling the user to navigate through the sequence of tasks in the workflow to accomplish an activity. In one embodiment of the present invention, the interactive utility enabling the user to navigate through the tasks in the workflow is a graphical control for selecting a specified step in the workflow. The user may select a specified step in the workflow to navigate backward and forward through the workflow by clicking on graphical controls 325-345 representing the steps in the identified workflow.

For example, in this illustrative example, user has selected graphical control 325 representing step 1 in the workflow. Content portlet 350 is visualized on portal page 310 in association with specified step 1. Both control portlet 320 and content portlet 350 associated with the specified step are displayed simultaneously on portal page 310. If user next selects graphical control 330 representing step 2 in the workflow, control portlet 320 will remove or hide content portlet 350 associated with step 1 and add or display one or more content portlets associated with step 2 (as is shown in FIG. 4B). In this manner, control portlet 320 serves as a navigation mechanism permitting a user to navigate backward and forward within the sequence of tasks on portal page 310 without major re-engineering of content portlets.

Workflow visualization on control portlet 320 may take the form of a graphical user interface (GUI) control, an icon, a hyperlink, a flowchart, a state diagram, or a Business process definition. The aspects of present invention are not limited to these embodiments but may encompass other means for representing a workflow on a portal page.

In addition to controlling navigation of content portlets, control portlet 320 also ensures that data in the content portlets is saved. Control portlet 320 can save data from an execution of a current task in the identified workflow before executing a subsequent task in the identified workflow. Control portlet 320 scrapes data from portal page 310 and ensures that all form elements are saved before going to the next step in the sequence. Methods for saving portlet state by scraping data from a web form and providing that data to a content portlet is known in the prior art.

Control portlet 320 can also ensure that data is validated. If content portlet 350 contains an input from which requires a user to enter data, the data entered can be validated when making the transition from one step to the next step. Data validation typically ensures that the data entered is correct or within acceptable limits.

Figure 4A:
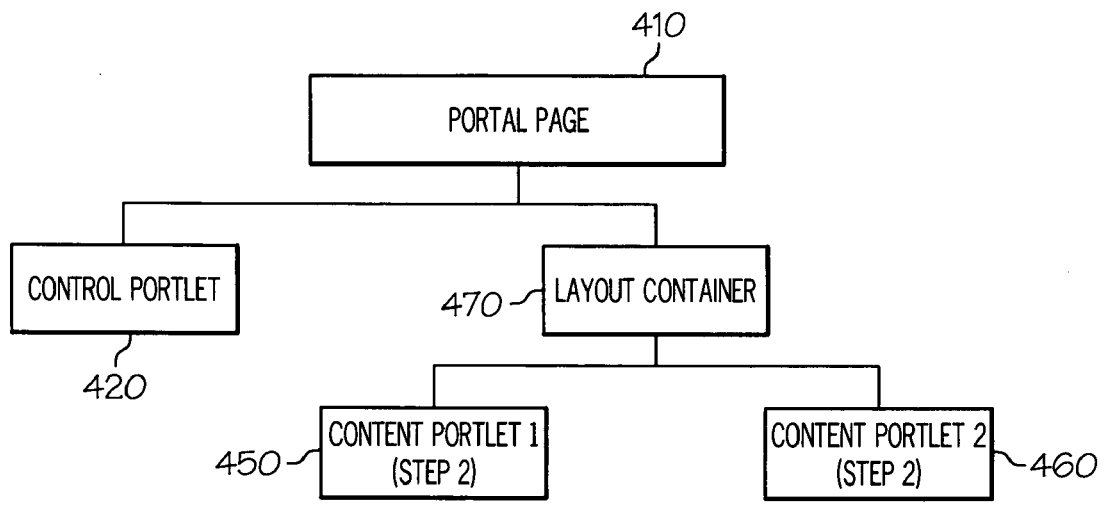
FIG. 4A is another exemplary diagram illustrating a portal page hierarchy in accordance with one exemplary embodiment of the present invention.
Figure 4B:
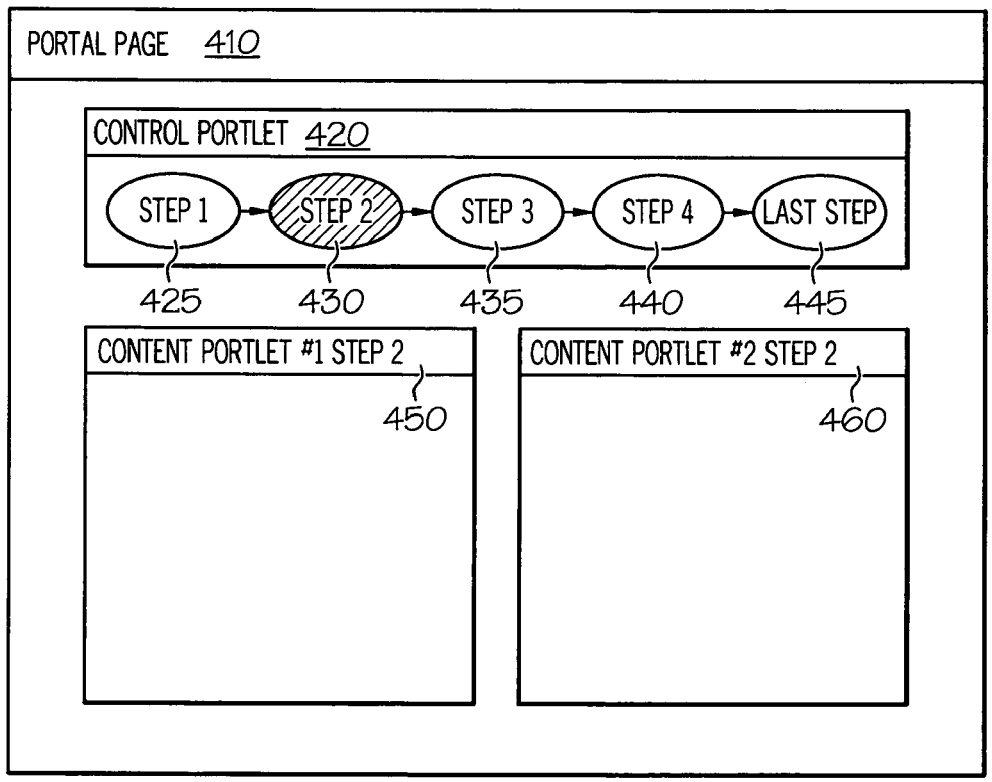
FIG. 4B is another exemplary illustration of portal page visualization in accordance with one exemplary embodiment of the present invention.

FIG. 4A is a diagram illustrating a portal page hierarchy in which multiple content portlets 450 and 460 are displayed in association with the specified step, in accordance with one exemplary embodiment of the present invention. One or more content portlets 450 and 460 associated with a selected step in the flow are displayed with control portlet 420 on portal page 410. Multiple content portlets may be displayed in association with a specified step of the sequence or flow.

In this illustrative example, content portlet 1 450 and content portlet 2 460 are retrieved by layout container 470 in response to user selection of step 2 in the workflow by selecting graphical control 430 (as is shown in FIG. 4B). In response to this user input, all content portlets associated with step 2 are displayed on portal page 410 in conjunction with control portlet 420.

In this illustrative example, content portlet 1 (element 450) and content portlet 2 (element 460) are retrieved by layout container 470 in response to user selection of step 2 in the workflow by selecting graphical control 430 (as is shown in FIG. 4B). In response to this user input, all content portlets associated with step 2 are displayed on portal page 410 in conjunction with control portlet 420.

FIG. 4B is another exemplary illustration of portal page visualization in accordance with one exemplary embodiment of the present invention. Referring now to FIG. 4B, multiple content portlets, such as content portlets 450 and 460, associated with a particular step of a sequence can be visualized on portal page 410 in windows at the same time. In this illustrative example, a user has selected step 2 by clicking on a graphical control "step 2" (element 430) representing step 2 on control portlet 420. In response to user selection of a different step in the sequence, control portlet 420 dynamically changes the contents of portal page 410 to remove content portlet associated with step 1 and add or display content portlet #1 (element 450) and content portlet #2 (element 460) associated with step 2 in the sequence. Thus, all of the content portlets associated with step 2 are displayed on portal page 410 along with control portlet 420.

Figure 5:
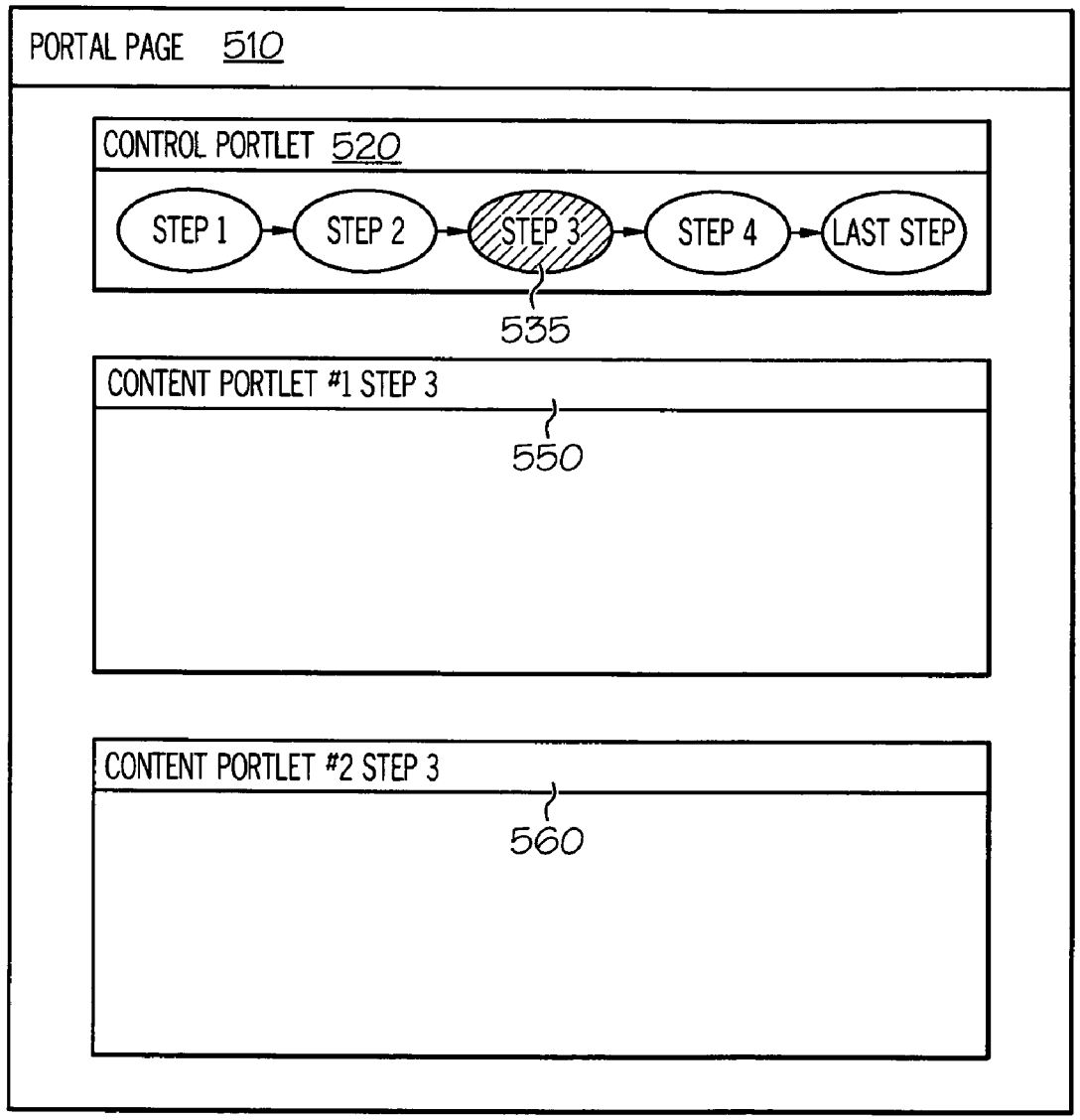
FIG. 5 is another exemplary illustration of a portal page visualization in accordance with one exemplary embodiment of the present invention.

FIG. 5 is another exemplary illustration of portal page visualization in accordance with one exemplary embodiment of the present invention. FIG. 5 is an example of portal page visualization in accordance with one exemplary embodiment of the present invention. In this example, content portlet #1 550 and content portlet #2 560 are displayed on portal page 510 along with control portlet 520. However, control portlet 520 may also be minimized or operating in the background, rather than visualized as in this illustrative example. Each specified step in the workflow could require visualization of a different set of content portlets in association with that specified step. For example, in FIG. 4B, content portlets 450-460 are displayed in association with step 2 in the workflow. However, in FIG. 5, control portlet displays other content portlet #1 550 and content portlet #2 560 associated with step 3 in response to user selection of graphical control 535 representing step 3 in the workflow. Thus, in accordance with the aspects of the present invention, a different set of content portlets may be associated with each step in a workflow. In response to user selection of other step in the workflow, control portlet 520 would remove content portlets 550-560 associated with step 3 and display one or more other content portlets associated with other specified step.

Figure 6A:
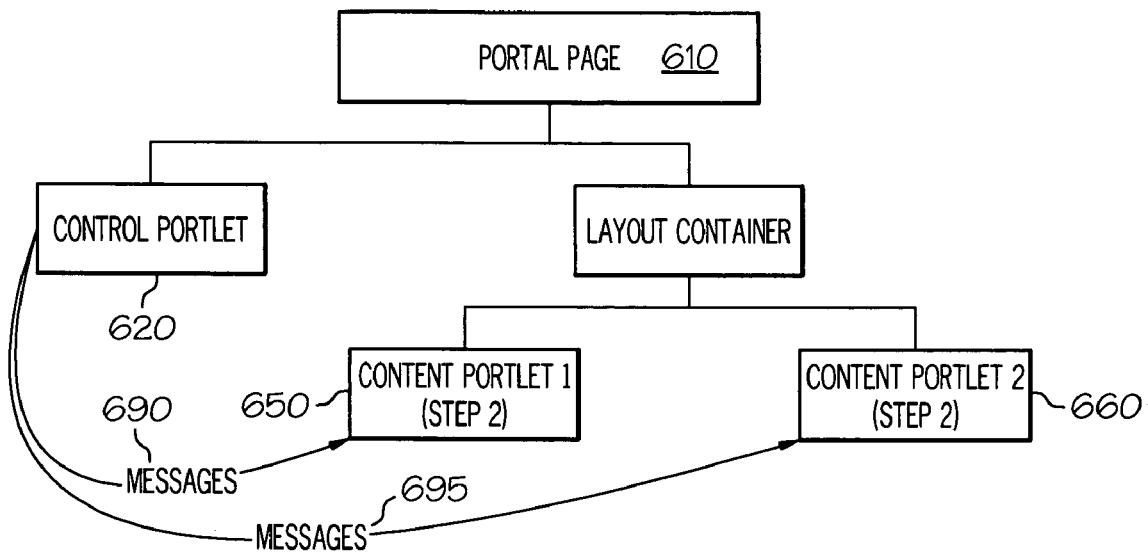
FIG. 6A is another exemplary diagram illustrating a portal page hierarchy in which messages are sent by the control portlet to content portlets in accordance with one exemplary embodiment of the present invention.

FIG. 6A is another exemplary diagram illustrating a portal page hierarchy in which messages are sent by the control portlet to content portlets in accordance with one exemplary embodiment of the present invention. Control portlet 620 controls the sequencing of steps on portal page 610 by passing messages, such as messages 690 and 695, to content portlets 650 and 660. Control portlet can send one or more of the following messages to a content portlet:

StepInitiated message is sent to indicate that a current step is initiated after content portlets for a previous step are removed and content portlets for a current specified step are added or displayed;

StepCompleted message is sent to indicated that a current specified step is completed before the content portlets associated with that completed step are removed from portal page;

StepValidated is sent upon validation of a specified step in the sequence;

PortletStateSaved message is sent upon saving the state of content portlets; and/or PortletStateRestored message is sent upon restoring the state of content portlets.

Portlet state constitutes the currently displayed contents of a portlet. If the portlet is displaying an input form for data entry, user entered data will also be a part of the portlet state. PortletStateSaved message provides the opportunity to perform any logic inside the portlet code after the portlet state has been saved. PortletStateRestored message provides the opportunity to perform any logic inside the portlet code after the portlet state has been restored.

These and other messages are sent by control portlet 620 to content portlets 650 and 660 to control display and implementation of content portlets in the sequence. Content portlets receive these messages and performs appropriate action in response.

Figure 6B:
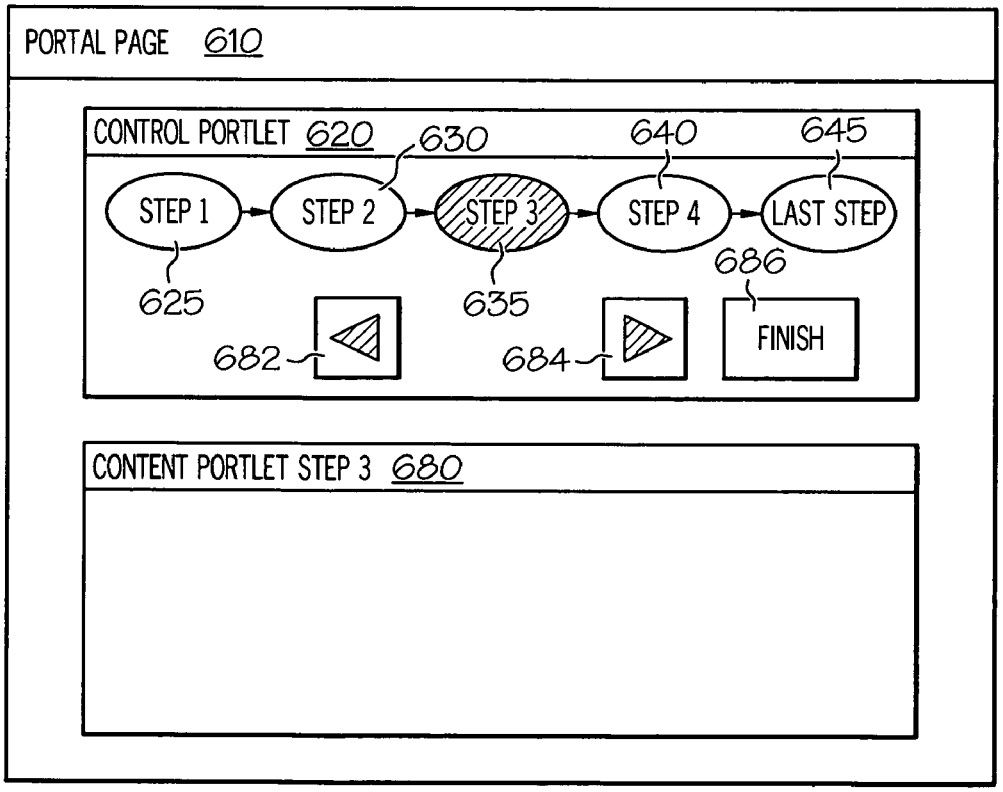
FIG. 6B is another exemplary illustration of portal page visualization in accordance with one exemplary embodiment of the present invention.

FIG. 6B is another exemplary illustration of portal page visualization in accordance with one exemplary embodiment of the present invention. In this illustrative example, content portlet 680 associated with the specified step is displayed on portal page 610 in response to user selection of graphical control 635. The graphical controls 625-645 representing the steps in the identified workflow are displayed on control portlet 620. Graphical controls 625-645 are end-user clickable and permit a user to navigate between steps in the sequence by clicking or selecting a graphical control representing a particular step in the workflow.

In this embodiment of the present invention, a back arrow control 682, a forward arrow control 684, and a finish control 686 is provided on control portlet 620 to enable a user to navigate backward and forward through various steps in the sequence.

In an alternative embodiment, control portlet 620 could include a BACK, NEXT, START, and/or FINISH graphical control or link on control portlet 620 enabling the user to navigate through the steps in a workflow.

Figure 7A:
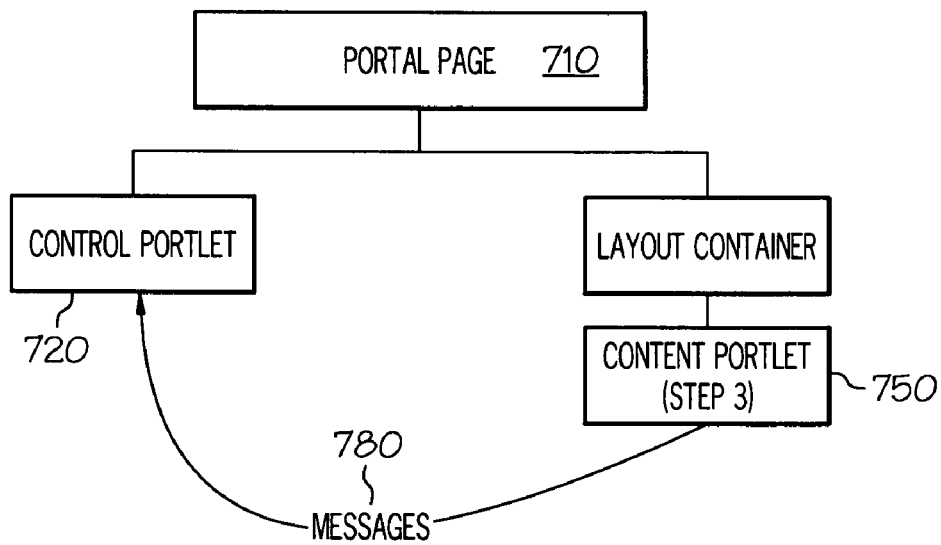
FIG. 7A is another exemplary diagram illustrating a portal page hierarchy in which messages are sent by a portlet to a control portlet in accordance with one exemplary embodiment of the present invention.

FIG. 7A is another exemplary diagram illustrating a portal page hierarchy in which messages 780 are sent by content portlet 750 to control portlet 720 in accordance with one exemplary embodiment of the present invention. In addition to messages received by content portlets from control portlet 690 and 695 (as illustrated in FIG. 6A), content portlet 750 may also send messages 780 to control portlet 720 in an alternative embodiment of the present invention. In response to receiving messages 780 from content portlet 750 indicating user selection of a new specified step in the workflow, control portlet 720 will programmatically manipulate the page hierarchy by removing content portlet 750 displayed on portal page 710 and adding content portlets for the newly specified step selected by user.

Figure 7B:
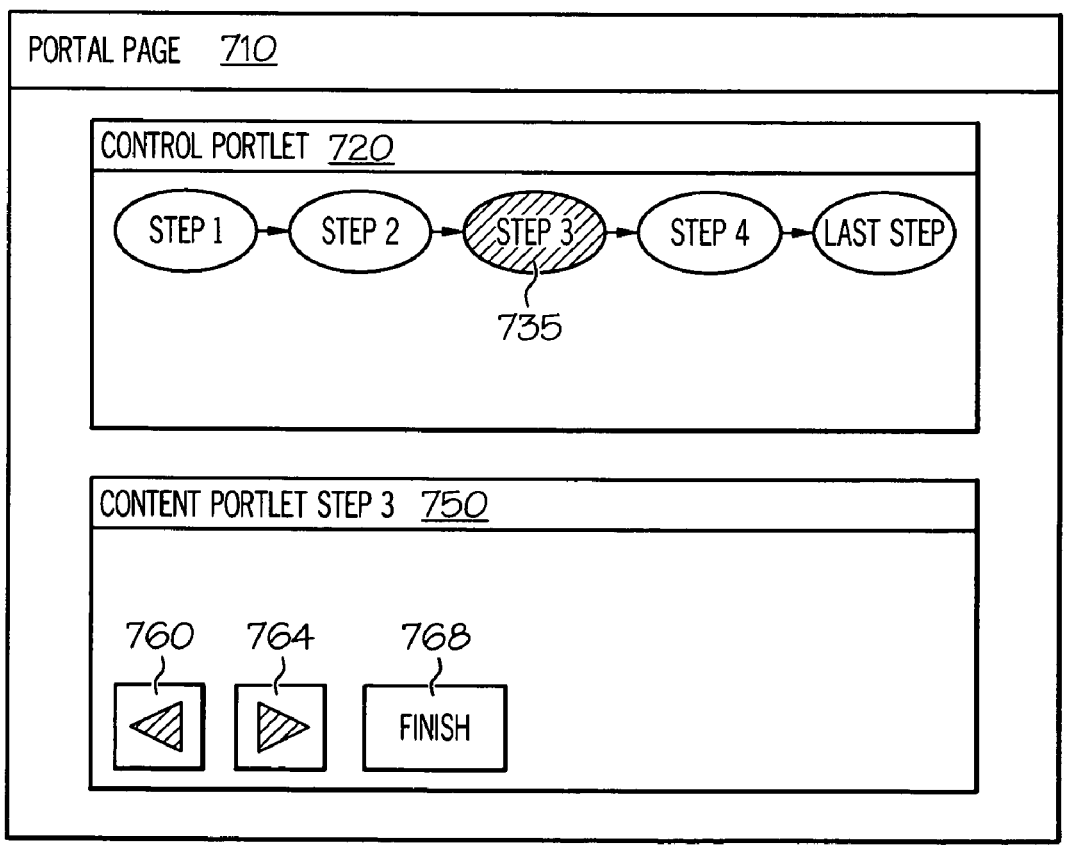
FIG. 7B is another exemplary illustration of portal page visualization in accordance with one exemplary embodiment of the present invention.

Referring to FIG. 7B, this is an example of portal page visualization in which navigation graphical controls are located on content portlet 750 in accordance with one embodiment of the present invention. In this embodiment of the present invention, content portlet 750 displays graphical controls 760-768 permitting a user to navigate through the sequence of tasks within the workflow, in addition to the graphical controls displayed on control portlet 720 representing the various steps in the workflow, such as graphical control 735 representing step 3 in the workflow.

In this illustrative example, control portlet 750 provides a back arrow control 760, a forward arrow control 764, and a finish control 768 enabling a user to navigate between steps in the workflow. When a user clicks on a graphical control on content portlet a message is sent to control portlet 720 enabling control portlet 720 to take appropriate action with respect to display of content portlets on portal page 710.

Content portlet 750 may send the following messages to control portlet 720 in response to a user selecting or clicking on a navigation graphical control located on content portlet 750:

NextStep message indicating user selection of a next step in the workflow;

PreviousStep message indicating user selection of the previous step in the workflow;

FirstStep message indicating user selection of the start point in the sequence; and/or LastStep indicating user selection of the final step in the workflow.

In response to receiving a message from content portlet 750 control portlet takes appropriate action with respect to display of content portlets on portal page 710.

In one embodiment of the present invention, control portlet utilizes Websphere® Portal Portlet messaging utility to send messages to content portlets and/or receive messages form content portlets.

In another embodiment of the present invention, the interactive utility enabling a user to navigate through the sequence of tasks is provided entirely on content portlet. Thus, control portlet may act as the sole navigation mechanism enabling a user to move backward and forward within the workflow by sending messages to control portlet indicating appropriate action for control portlet to take regarding the display of content portlets on portal page.

Figure 8:
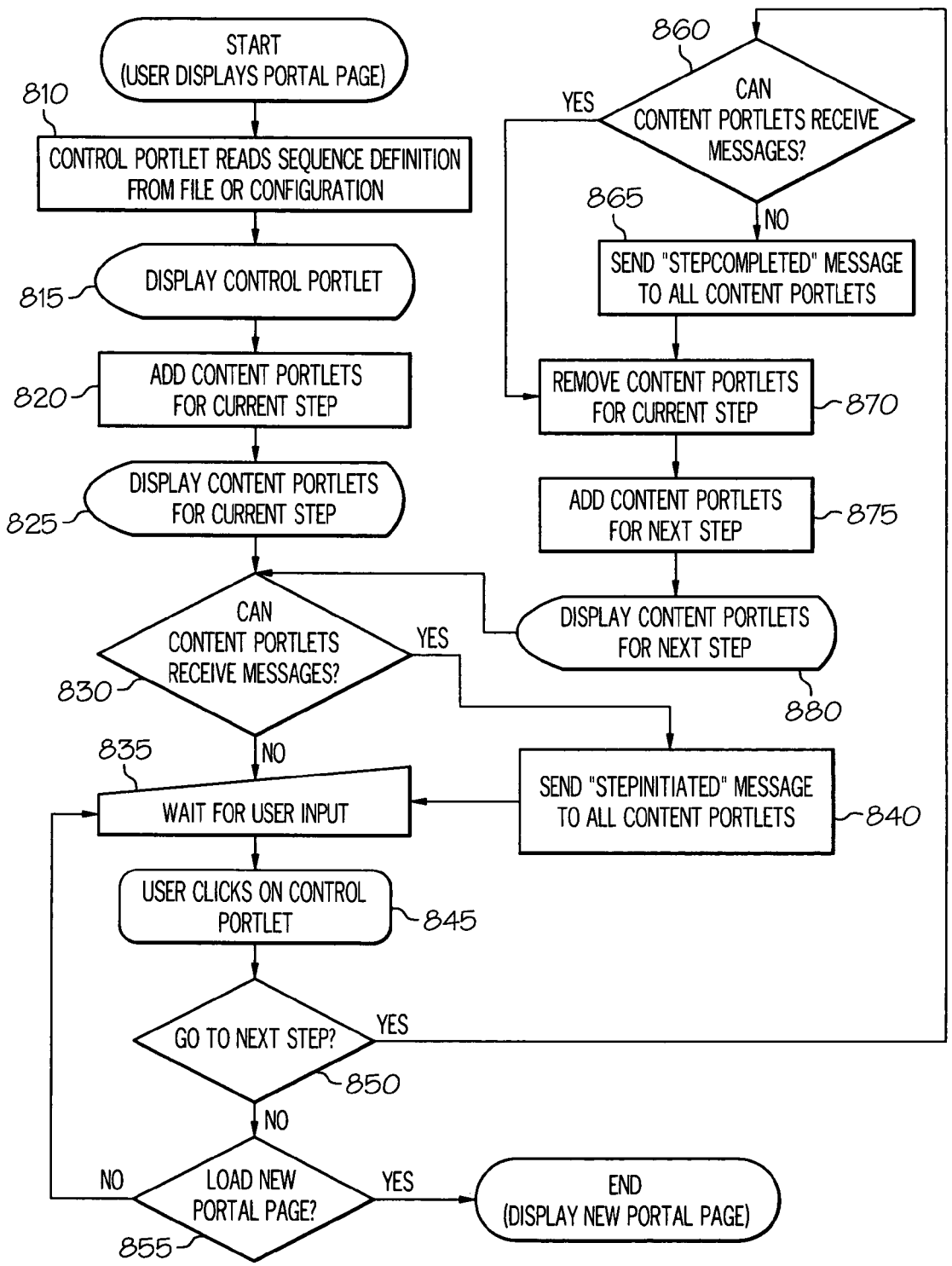
FIG. 8 is a flowchart outlining an exemplary operation of the present invention when a user implements the wizard-like capabilities to navigate forward and backward within a sequence of portlets on a portal page in accordance with one exemplary embodiment of the present invention.

FIG. 8 is a flowchart outlining an exemplary operation of the present invention when a user implements the interactive utility enabling a user to navigate forward and backward within a sequence of portlets on a portal page in accordance with one exemplary embodiment of the present invention. The following process is performed in control portlet 320 of FIG. 3B.

As the process begins, control portlet reads a sequence definition from a file or configuration specifying an identified workflow and associated content portlets for each step in the workflow (step 810). Control portlet visualization is displayed on portal page, including a graphical representation of steps in the sequence (step 815). Content portlets associated with a specified step are added (step 820) and displayed on portal page (step 825). A specified step in an identified workflow comprises one or more specified tasks associated with the specified step in the workflow.

A determination is made as to whether content portlets can receive messages from control portlet (step 830). A "stepInitiated" message is sent to all content portlets associated with the specified step in the workflow indicating that content portlets for the specified step have been initiated and content portlets associated with specified step have been added, if it is determined that content portlets can receive messages (step 840). If content portlets cannot receive messages, control portlet waits for user input (step 835).

When a user selects an action by clicking on a graphical control, icon or link on control portlet (step 845), control portlet determines whether to go to the next step (step 850). If control portlet determines that user does not request to go to next step, a determination is made (step 855) as to whether to load a new portal page or wait for additional user input back (step 835).

If user has selected to go to another step in the sequence, control portlet determines whether content portlets can receive messages from control portlet (step 860). If content portlet cannot receive messages, control portlet sends a "stepCompleted" message to all content portlets (step 865).

Control portlet removes all content portlets associated with the current specified step (step 870) and adds all content portlets for the next specified step (step 875). The process displays content portlets associated with the next specified step on portal page (step 880).

If content portlets can receive messages from control portlet, control portlet will send a "stepInitiated" message to content portlets indicating initiation of the current specified step. Control portlet will wait for additional user input at step 835.

Those of ordinary skill in the art will appreciate that the steps detailed in FIG. 8 may vary. For example, other steps, such as steps to receive messages from content portlets may be used in addition to those steps already included.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing a plurality of content portlets in a portal page, the computer implemented method comprising:

identifying a workflow for the plurality of content portlets in the portal page to form an identified workflow, wherein the identified workflow specifies a sequence of tasks in which the plurality of content portlets are executed;

displaying the identified workflow as a series of step icons on a portal page;

controlling execution and display of content portlets within the plurality of content portlets through a control portlet in the portal page using the identified workflow;

receiving, from a user, a selection of a selected step icon from the series of step icons; and displaying, on the portal page, a first content portlet that corresponds to the selected step icon.

2. The computer implemented method of claim 1, wherein multiple content portlets are associated with the selected step icon, the computer implemented method further comprising:

in response to the selected step icon being selected by the user, simultaneously displaying the multiple content portlets on the portal page.

3. The computer implemented method of claim 1 further comprising saving, by the control portlet, data from an execution of a current task in the identified workflow before executing a subsequent task in the identified workflow.

4. The computer implemented method of claim 1, wherein the workflow is defined by specifying the sequence of tasks as sequential entries in a structured file.

5. The computer implemented method of claim 1, further comprising displaying at least one of a content portlet associated with a specified task in the sequence of tasks.

6. The computer implemented method of claim 1, further comprising sending a message by the control portlet to at least one of a content portlet associated with a specified task in the sequence of tasks.

7. The computer implemented method of claim 1, wherein the structured file is a comma separated value (CSV) file.

8. The computer implemented method of claim 1, further comprising validating a data of the first content portlet, wherein validating the data ensures that data entered into the first content portlet is within predetermined limits.

9. A computer program product comprising:

a computer usable storage medium on which is stored computer usable program code for managing a plurality of content portlets in a portal page, said computer program product comprising:

computer usable program code for identifying a workflow for the plurality of content portlets in the portal page to form an identified workflow, wherein the identified workflow specifies a sequence of tasks in which the plurality of content portlets are executed;

computer usable program code for displaying the identified workflow as a series of step icons on a portal page;

computer usable program code for controlling execution and display of content portlets within the plurality of content portlets through a control portlet in the portal page using the identified workflow;

computer usable program code for receiving, from a user, a selection of a selection step icon from the series of step icons; and computer usable program code for displaying, on the portal page, a first content portlet that corresponds to the selected step icon.

10. The computer program product of claim 9, wherein a task in the sequence of tasks in the workflow comprises computer usable program code for presenting content from at least one of a content portlet based on the identified workflow.

11. The computer program product of claim 9 further comprising computer usable program code for saving, by the control portlet, data from an execution of a current task in the identified workflow before executing a subsequent task in the identified workflow.

12. The computer program product of claim 9 further comprising computer usable program code for sending a message by the control portlet to at least one of a content portlet associated with a specified task in the sequence of tasks.

13. The computer program product of claim 9 further comprising computer usable program code for providing a graphical user interface on the control portlet.

14. The computer program product of claim 9 further comprising computer usable program code for providing a graphical user interface on at least one of a content portlet.

15. The computer program product of claim 9 further comprising computer usable program code for sending a message by a content portlet to a control portlet.

16. The computer program product of claim 9 further comprising computer usable program code for sending a message by a content portlet.

17. An apparatus for managing a plurality of content portlets in a portal page, comprising:

a computer comprising:
a bus;
a storage device connected to the bus, wherein the storage device contains a computer usable program product; and
a processor unit, wherein the processor unit executes the computer usable program product to:
identify a workflow for a plurality of content portlets in the portal page to form an identified workflow, wherein the identified workflow specifies a sequence of tasks in which the plurality of content portlets are executed;
display the identified workflow as a series of step icons on a portal page;
control execution and display of content portlets within the plurality of content portlets through a control portlet in the portal page using the identified workflow;
receive, from a user, a selection of a selected step icon from the series of step icons; and
display, on the portal page, a first content portlet that corresponds to the selected step icon.

* * * * *

UNITED STATES PATENT AND TRADEMARK OFFICE
CERTIFICATE OF CORRECTION

PATENT NO.      : 7,661,061 B2
APPLICATION NO. : 11/252301
DATED           : February 9, 2010
INVENTOR(S)     : Niraj P. Joshi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1136 days.

Signed and Sealed this

Thirtieth Day of November, 2010

David J. Kappos
*Director of the United States Patent and Trademark Office*